United States Patent [19]

Ricketts et al.

[11] 4,375,079
[45] Feb. 22, 1983

[54] DIGITAL DATA DISPLAY SYSTEM

[75] Inventors: Martin W. Ricketts; Neil A. Stubbens, both of Eastleigh, England

[73] Assignee: International Business Machines Corp., Armonk, N.Y.

[21] Appl. No.: 185,104

[22] Filed: Sep. 8, 1980

[30] Foreign Application Priority Data

Sep. 27, 1979 [GB] United Kingdom ............... 7933534

[51] Int. Cl.³ .................. B41B 15/40; G08B 5/22
[52] U.S. Cl. .................. 364/518; 364/900; 340/790; 340/721; 340/724; 340/798; 340/747
[58] Field of Search ............ 364/518, 514, 515, 522, 364/200 MS File, 900; 340/726, 792, 709, 747, 748, 798, 800, 723, 724, 744, 721, 703, 790

[56] References Cited

U.S. PATENT DOCUMENTS

| 3,899,662 | 8/1975 | Kreeger | 364/522 |
| 3,996,563 | 12/1976 | Baylis | 364/900 |
| 4,011,556 | 3/1977 | Tochitani | 340/798 |
| 4,070,662 | 1/1978 | Narveson | 340/726 |
| 4,091,424 | 2/1977 | Widergren | 358/260 |
| 4,129,858 | 12/1978 | Hara | 340/750 |

FOREIGN PATENT DOCUMENTS 2022378 12/1979 United Kingdom .

OTHER PUBLICATIONS

Dhake, Arvind, M., Television Engineering, 1980, pp. 8-14.

Primary Examiner—Mark E. Nusbaum
Assistant Examiner—Michael R. Fleming
Attorney, Agent, or Firm—W. S. Robertson

[57] ABSTRACT

A digital data display in which each display unit includes a random access, read/write character definition buffer store and a screen buffer. The character definitions and screen buffer for each picture to be displayed are constructed in a remote host central processing unit. In order to minimize the time that a user has a blank screen while new character definition and screen buffer data is sent from the c.p.u. to the display unit, this information is sent in groups relating to rows of character cells on the screen and a coherent picture is displayed growing from the top downwards, giving a roller blind effect. Data relating to the first significant row is sent initially followed by groups of character definitions and screen buffer data, the size of the groups dependent upon the characteristics of the transmission buffer.

6 Claims, 19 Drawing Figures

```
                         BYTES
                 1  3  5  7  9  11 13 15 17
                 1  1  0  0  0  0  0  0  0
                 1  1  0  0  0  0  0  0  0
                 1  1  0  0  0  0  0  0  0
                 1  1  0  0  0  0  0  0  0
                 1  1  0  0  0  0  0  0  0
                 1  1  0  0  0  0  0  0  0
                 1  1  0  0  0  0  0  0  0
      BYTES      1  1  0  0  0  0  0  0  0
   2,4,6,8,10,   1  1  0  0  0  0  0  0  0
   12,14,16,18.  1  1  0  0  0  0  0  0  0
                 1  1  0  0  0  0  0  0  0
                 1  1  0  0  0  0  0  0  0
                 1  1  0  0  0  0  0  0  0
                 1  1  0  0  0  0  0  0  0
                 1  1  0  0  0  0  0  0  0
                 1  1  0  0  0  0  0  0  0
```

DIGITAL DATA DISPLAY SYSTEM

RELATED APPLICATIONS

Our application Ser. No. 7933534 for this invention was filed in the United Kingdom on Sept. 27, 1979.

Our application Ser. No. 189,526, filed Sept. 22, 1980 for "Digital Data Display System" relates to a display system of the type described in this specification.

Field of the Invention

This invention relates to a display system of the type in which information is displayed not only in the form of alphanumeric characters but in the form of graphical pictures, such as graphs, bar and pie charts which illustrate relationships between values in a way that is easy to understand.

The Prior Art

A review of some of the prior art techniques used to display graphical pictures is found in the Communication of the ACM, Fet 1974 (Vol. 17, No. 12) pages 70–77, a paper entitled "A Cell Organized Raster Display For Line Drawings" by B. W. Jordan and R. C. Barrett. This paper discussed the differences between random scan or directed beam displays and raster scan displays and then describes an implementation of a raster scan display using a screen that is notionally divided into a number of cells each cell having a matrix of bit positions. As described in the paper, the display system has four basic sections, a display screen, a display output buffer, a character generator and a refresh memory. The character generator which is said to be the "heart of the graphics terminal" is a special purpose processor dedicated to the preparation of graphical figures. The use of such a special purpose processor is obviously an expensive item in a graphic terminal.

U.K. Patent Specification No. 1,330,748 (Applied Digital Systems Inc.) and U.S. Pat. No. 3,891,982 (Adage Inc.) both describe apparatus for forming a display of graphical and alphanumeric data. The U.K. Patent Specification describes a system in which alphanumeric and graphical data are treated separately until they are applied to a screen through a video signal generator. In the U.S. Patent, the apparatus described operates to repetitively generate a video signal for driving a raster scan display from data encoded in data words representing image components. The raster scan is considered as being divisible into a rectilinear array of rows and columns of cells, each image component, as encoded, lying within a single cell. More than one image component can be provided in each cell. The apparatus includes a serial refresh memory for holding, in cell order, data words defining an image to be displayed. The contents of the memory are selectively advanced to read out all data words relating to a given cell and they are decoded to generate signals defining corresponding image elements. An accumulation register accumulates the picture elements defined by a succession of data words relating to a given cell and means are provided for storing and serially reading out the accumulated data as a video signal to the raster scan display.

U.S. Pat. Nos. 3,293,614 and 3,351,929 both assigned to Hazeltine Research Inc. relate to digital data systems. The first (614) describes a system in which the screen is divided into a plurality of illuminable dot elements, or picture elements (pels) and the associated storage means has a separate storage element for each pel. A full pel buffer is a very large storage device. The second patent (929) describes a technique to reduce the amount of storage required by storing character information according to address information included with each character word. The addresses are divided into a coarse address and a fine address. The coarse address determines within which character sized segment of the display the character is to begin and the fine address locates the character within the segment. The combination of the coarse and the fine address allows the character to be located at any point on the display.

In our related application Ser. No. 189,526 there is described a digital data display system for presenting a graphical picture on an output device in which the area or screen from which the picture is to be viewed is notionally divided into a plurality of character cells each of which comprises a predetermined number of picture elements (pels), the system comprising means for creating, in response to input information, a first level description of all the elements of a picture to be presented, means for storing a screen definition table having an entry for each character cell of the display area, means for calculating for each element of the picture the pattern of pels in associated character cells required to display the elements, storing the calculated pattern in a table in a character cell store and associating the respective entry in the screen definition table with the required pattern in the character cell store, means to determine when a particular character pel pattern has already been calculated as required for a picture and to associate the respective screen definition table entries with only one copy of the particular character cell pel pattern and means for transferring the screen definition table to a screen definition buffer store and the character cell pattern table to a character cell buffer store in the display device whereby the contents of the screen definition buffer store and character cell buffer store control the construction of a picture presented by the display device.

In such a system when the screen definition table and character cell pattern table are transmitted from the central processing unit to a display unit the actual process of loading the display unit buffers can take up to 10 seconds during which time the user is faced with a corrupted screen display on the screen which can become an irritant. This occurs because as soon as the character buffer is loaded with a new set of pointers to character definitions, until the new definitions are loaded into the character definition buffer the read out system of the display unit will be using the new pointers with previously loaded character definitions.

SUMMARY OF THE INVENTION

According to the present invention there is provided a digital data display system in which a raster scanned display device includes a character definition buffer store and a screen buffer for storing screen definition data relating display screen areas with character definitions stored in the buffer store. The system also includes a processing unit that is connected to the display device through a communications link and arranged to send character definition data and screen buffer data to the display device. When a new picture is to be presented on the screen of the display device, the processing unit is arranged to send screen buffer data and character definition data to the display device interleaved in a series of groups so that the new picture can be built and displayed on the screen from the groups of data as they are received at the display device and stored in their respective buffer and screen stores.

The foregoing and other objects, features and advantages of the invention will be apparent from the following more particular description of (a) preferred embodiment(s) of the invention, as illustrated in the accompanying drawing(s).

THE PREFERRED EMBODIMENT

Figure 1:
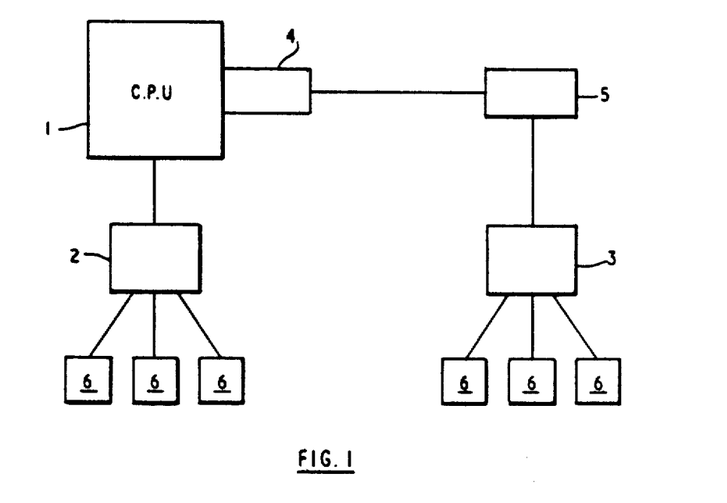
FIG. 1 shows in schematic form, the main components for implementing a digital data display system.

A Display Terminal System FIG. 1

Referring now to FIG. 1, there is shown a central processing unit 1 which may, for example, by an IBM System 370/168 machine. The central processing unit may have a direct connection to a display controller 2 and/or may be connected remotely to such a display controller 3 through a channel control unit 4 which is connected remotely to a network controller 5 which is turn may be connected to several display controllers 3. (Only one is shown.)

Each of the display controllers controls a plurality of display devices 6. The display devices usually comprise a visual display unit, such as a cathode ray tube and a separate keyboard, by which a user enters commands into the system. In order to implement the present invention, the display devices 6 each include a random access store as will be described below. The central processing unit 1 performs the main processing tasks required to control the display unit and also includes means for processing the display information in accordance with the invention.

In some prior art display terminals, such as the IBM 3270 series, there is a buffer store (sometimes called a refresh buffer) in the display unit which contains one entry for each character position on the screen. A character position may either contain a character (which may not actually be displayable, i.e. it may be blank or null), or a field attribute (which displays as a blank, but contains attribute information about how the characters in the following field are to appear, e.g. highlighted, invisible, etc.). In the former case, each character position entry in the character buffer contains an index which is used by the hardware character generator to access the definition of the pel pattern for that character. These definitions in this prior art display terminal are held in read only storage.

Figure 2:
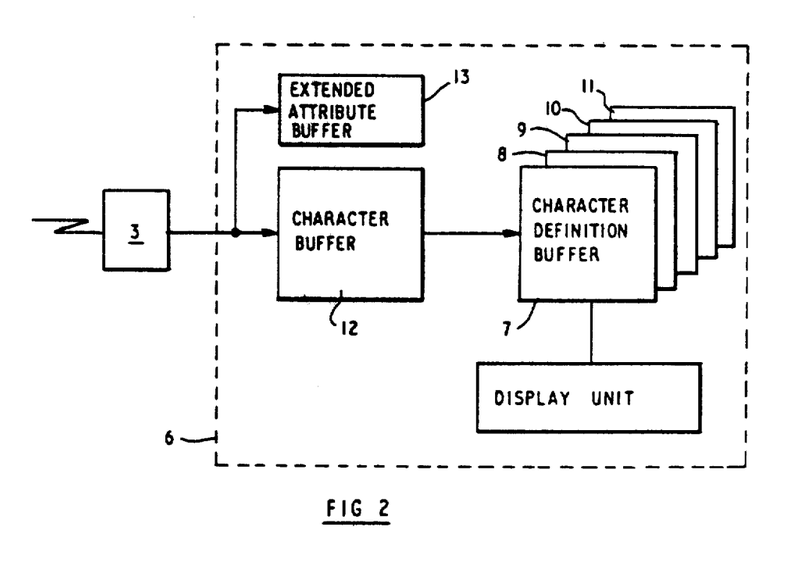
FIG. 2 shown in schematic form a display unit with a random access store.

The Display Head—FIG. 2

FIG. 2 shows in schematic form a display head incorporating the present invention. Instead of just a single set of read only storage character definitions the head contains two sets of character definitions held in read only stores 7 and 8 and up to six sets of character definitions contained in random access read/write stores 9, 10 and 11 (each of which in the drawing represents two random access read/write stores). The pel pattern definitions contained in these stores 9, 10, and 11 can be changed by input information from the central processing unit 4 (FIG. 1).

Programmable Symbols

In this specification these character definitions which can be stored in the random access stores 9, 10 and 11 are referred to as programmable symbols.

The character buffer 12 is supplemented by an extended attribute buffer 13, which contains, again on a character basis (except for the positions at which field attributes occur), additional information about the highlighting for that character position. If the display head uses a color tube, this additional information will include the color of the character and also the number or other identification of the character set from which the character definition is to be taken.

Of course, while the present description of the preferred embodiment refers to a display-head including a cathode ray tube, other embodiments using printers and other output display devices may be envisaged.

The display head may have provision for displaying character cells in a single color or in a plurality of colors, using, for example, combinations of red, green and blue. With a single color display the character definition buffers 9, 10 and 11 storing the programmable symbols contain one bit for each pel in a character cell (i.e. the pel definition for a single 9×16 character cell (144 pels) may be held in 18 bytes (144 bits) of storage). The pattern defined by the 18 bytes will be displayed in a single color (of necessity in a monochrome display, though not necessarily the same color in a color display), in each display position where is it referenced by the character buffer 12. Where a single color character display is used with a color display, the actual color is determined by the color bits in the appropriate position in the extended attribute buffer 13.

If there is to be more than one color within a single screen cell position, then triple character cells are used. There are then three bits for each screen pel, one for each of the primary color guns, red, green and blue. When only the red bit is on for a particular pel, that pel will be displayed in red; if red and green bits are on, the pel will be yellow, and so on. As the color definition is now within the character definition rather than in the extended attribute buffer 13, such a triple that is referenced in more than one screen position by the character buffer 12 will always appear with the same combination of colors.

Methods of using programmable symbols may be divided into two main categories: firstly, they may be used to define different character fonts (e.g. italic or Greek) and secondly, they may be used to allow graphic objects to be drawn to pel accuracy. These methods may be combined in the same picture display. The preferred embodiment described in this specification will be concerned with the drawing and displaying of graphic objects.

Using programmable symbols enables pel accurate graphics to be displayed on a refresh screen, or printed by a printer, without requiring the quantity of storage which would otherwise be necessary in the display unit to hold a complete pel buffer. This saving in storage is achieved because for all but the most complex pictures, a substantial number of screen character cell positions are either empty or contain exactly the same pel pattern as other cell positions so that the definition need be stored only once in the character definition buffer.

The use of programmable symbols is well suited to applications which are concerned with graphical presentations of data, making use of such features as area shading and the use of color and also for those applications in which the interaction is through the use of associated alphanumeric or function keys on a keyboard.

Figure 3:
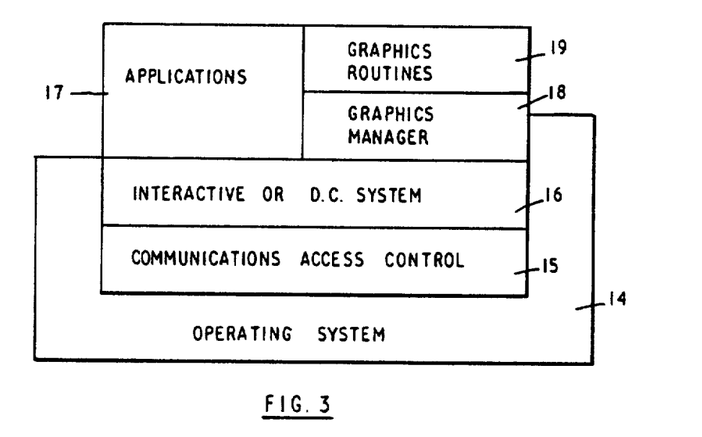
FIG. 3 shows in schematic form the system control services which control the operation of the digital data display system.

System Operation—FIG. 3

In general terms, the system that comprises the preferred embodiment of the present invention operates as follows.

A user of the digital data display system (FIG. 1) communicates interactively with a particular application program through a display unit 6. The application program will normally be stored in a back-up store connected with the central processing unit 1. When a user has identified the application programs that are required, the system control services (described later) of the digital data display system will load the application program into the working store of the central processing unit 1 and perform all the control and supervising services needed to run the application.

The application program will, typically, have been written so that at some point it will require the system control services to display data at the display unit 6. The data for the application program may have been supplied by the user directly from the keyboard contained in display unit 6 or it may have been obtained from a file in a data base to which the central processing unit 1 has access. The application program will request that the system control services display the data in a particular form, say for example, a bar chart. Having received the request and the data from the application program, the system control services then perform the necessary functions to display the data as required at the particular display unit 6 which the user is using.

The system control services which control the operation of the digital data display system are shown schematically in FIG. 3. The central processing unit 1, which as mentioned above, may be an IBM System 370/168, has an operating system 14, which may be IBM Virtual Machine Facility/370 (VM/370) described generally in the Introduction to IBM Virtual Machine Facility/370 GC20-1800-9 published by International Business Machines Corporation.

VM/370 manages the resources of an IBM System/370 in such a way that multiple users have a functional simulation of a computing system (a virtual machine) at their disposal. That is, the virtual machine runs as if it were a real machine simulating both hardware and software resources of the system. These simulating resources can be either shared with other virtual machines or alternatively allocated to each machine for a specified time. Virtual machines can run the same or different operating systems simultaneously, thus a user can create and adapt a virtual machine to meet the users needs. A description of the component parts and how VM/370 operates is found in the above referenced manual.

A user at a remote terminal 6 (FIG. 1) communicates with the central processing unit through the network controller 3 using the services of a communications access control system 15 (FIG. 3). The communication access control system 15 operates under the control of the operating system and organizes the transmission and reception of information (commands and data) to and from the remote network controllers.

An example of a communication access control system is the Virtual Telecommunications Access Method (VTAM) described in ACF/VTAM General Information Manual (GC38-0254) published by International Business Machines Corporation.

A third part of the system control services is the interactive or data communication system 16. The on-line real-time data base/data communication differs from batch processing systems in the amount and types of concurrent activities that are likely to occur within the processing system at a given time. Whereas a batch processing system schedules each application independently and provides data support unique to each application, a DB/DC system controls many transactions arriving on a random non-scheduled basis and provides an integrated data base supporting each application. To do this a DB/DC system requires the interactive or DC system 16 in addition to the basic operating system. An example of such a system is the Customer Information Control System (CICS) described in Customer Information Control System (CICS) General Information Manual (GH20-1028-4) published by International Business Machines Corporation.

The system control services which have been described above as blocks 14, 15 and 16 of FIG. 3 perform the basic control of a large scale data processing system enabling a user at a remote terminal to run specific application programs which are also stored in a storage device to which the processing unit has access. These are indicated at 17 in FIG. 3. Application programs can be directed to many different and diverse requirements from weekly or monthly accounting and payroll routines to planning analysis and tracking of space satellite systems. Such application can be run on the same digital data processing system simultaneously with users at adjacent terminals 6 (FIG. 1) using the system for very different applications. One thing that most applications require or result in is the presentation of data to the user often during the running of the application.

The present invention is directed towards facilitating the presentation of data at the display units either visual display units or printers represented as the units 6 of FIG. 1. To this end the central processing unit has two further parts to the system control services. These are shown as a graphics manager 18 and graphics routines 19 in FIG. 3. The operations of the graphics manager and the graphics routines and how they interact with the character definition buffers 7–11 of FIG. 2 will be described in more detail below.

Graphics Routines

When an application program reaches a point in its processing that requires data to be displayed at a display unit, call statements may be issued by the application which involve the graphics manager 18 and the graphics routines 19 of the system control services. With the call statements, the application program passes the address of the data to be displayed, together with information concerning the form that the display is to take, whether as a bar chart, pie chart, venn diagram etc., together with the axes where appropriate and the area of the particular display device where the data is to appear, e.g. a graph may appear in only the top half of the display with an alphabetic character explanation in the bottom half.

The graphics routines 19 and graphics manager 18 perform the following functions which are initially described in general terms.

The graphics routines 19 accept information passed by the application program in the call statements and then decides how the picture is to be drawn. If the picture is not to be a full screen or page, this information is passed to the manager. If the axes of the graph are to be drawn, then the coordinates relating to two lines are passed to the manager. The data to be displayed is then fetched from the storage address given in the call statements and the appropriate processing carried out. For example, the graphics routines 19 include several subroutines for manipulating and processing data so that the appropriate picture can be drawn. Such routines are:

a. Line Graph Routine

Line curves consist of a set of data points joined by lines. Special "marker" symbols are calculated to be drawn at each of the data points. The routine includes an option of presenting only the symbols to give a scatter plot, or to omit the symbols leaving only the lines to indicate the curve.

b. Surface Curve Routine

Surface curves are very similar to line curves; they differ only in two respects. No symbols are plotted at the data points and the area between the curve and the independent variable axis, or some datum line parallel to it, is shaded.

c. Histograms

The data for line graphs is such that the dependent variable is a measure of a particular quantity across a defined range of values of the independent variable. Data for histograms differs in that the dependent variable is the measure of a particular quantity over a range of values of the independent variable. The histogram may be plotted as a number of bars. Each bar has the width given by the range and ends at the corresponding data value. The bar starts at the axis or a datum reference line.

d. Bar Charts

Bar charts are appropriate for data where the independent variable is not continuous or has no physical meaning. The bars are spaced equally along an independent axis. A composite bar chart appears as though it was constructed from a single component bar chart (assumed for simplicity to have vertical bars) by dividing each bar horizontally, effectively giving a set of smaller bars on top of one another. The lengths of each of the smaller bars in a layer correspond to the contribution of a particular component to the total.

e. Pie Charts

A pie chart is used to illustrate the way in which a variable is partitioned into several classes according to some attribute.

This is represented graphically by dividing a circle into sectors, one for each class, with the angle of each sector being proportional to the contribution to the total from each class.

The data provided to draw a pie chart is a set of values, one for each sector of the pie. These values may be expressed as percentages of the total, or as absolute values.

The plot produced will consist of a sector for each valid value given. For each such value, V, the angle in degrees, A, of the sector will be given by:

$$A = 360*V/100$$

for percentage values, or $$A = 360*V/TOTAL$$

if the values are absolute, and where TOTAL is the sum of all the valid values.

If the values are given as percentages and the total of the valid values is less than 100, then an incomplete circle will be drawn. The sector corresponding to the missing percentage will not be drawn.

The sectors are drawn in a clockwise direction. The first sector is drawn from the 12 o'clock position.

A set of tables is also given, one for each sector of the pie. If provided, these are drawn opposite the sector to which they apply. If labels overlap because the angles for successive labels are small, the labels are moved up or down. Each label may optionally be preceded by a numeric value which is either the percentage that the corresponding value is of the total, or the absolute value, depending on the chart type. The labels are joined to the sectors by lines. The line runs radially outward from the sector until it intersects the largest circle that can be drawn without the plot. From that point it runs out horizontally to the label.

A multiple pie chart consists of 2 or more pies (one for each component) with their centers arranged along a horizontal or vertical line.

Figure 4:
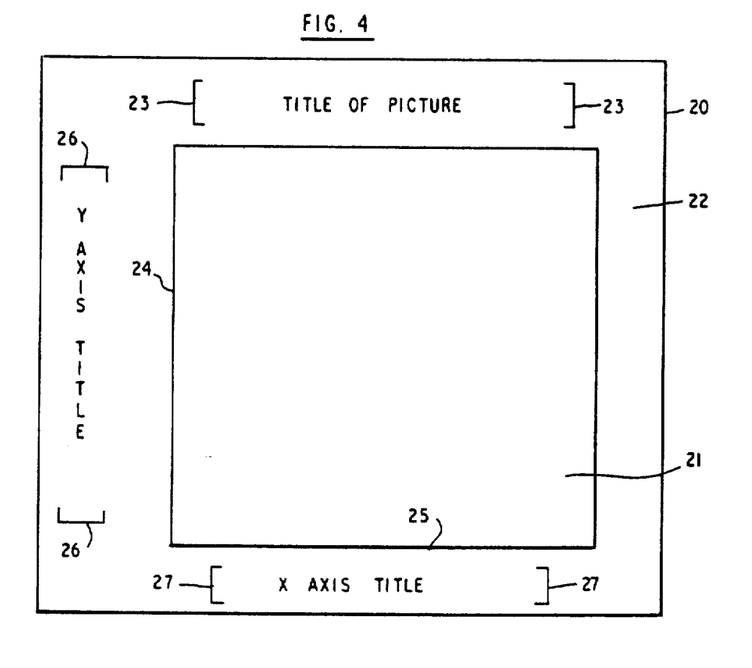
FIG. 4 illustrates the layout of a picture displayed on a display unit.

The overall layout for a picture is shown in FIG. 4. The picture area 20 may be a full screen or page, but would usually be less—either half or quarter screen size. The area 21 is the kernal of the picture, the position and size of which may be varied by the information passed by the application program. The area 22 is the picture margin and the title of the picture appears between the brackets 23. The line 24 is the Y axis and the line 25 the X axis, with the Y axis title appearing between the brackets 26 and the X axis title between the brackets 27.

Chart construction is considered to take place in two steps:

1. Drawing the axes. 2. Plotting the data on the axes.

Corresponding to this, the plotting process may be viewed in one of two processing states:

1. "Unscaled"—before axes have been drawn (called state one). 2. "Scaled"—after axes have been drawn (called state two).

Routines which affect how the axes are to be drawn and the general appearance of the chart are called only when the plotting process is in the "unscaled" state. This applies to the data which define the heading, axis titles, range, intercept, axis labelling, number of components and options. Also in this category is the specification of the datum reference lines. These routines merely set parameters for the axis-drawing process.

The plotting process changes from the "unscaled" state to a "scaled" state when any of the plotting routines is invoked in the unscaled state. At this time, if axes are required, selected unscaled axes are autoscaled and the selected axes are then drawn together with the associated titles. The chart heading is also drawn at this time. If a duplicate of either axis is specified, it is also drawn. If the plotting routine is for a Venn diagram, only the chart leading and primary X axis title will accompany the diagram. For Pie Charts, the chart heading is drawn and the rest of the chart is drawn as described for the pie chart function. Once in the "scaled" state, any number of calls to the plotting routines can be made to construct the data part of the chart.

In the case of pie charts and Venn diagrams, the scaled state is further designated "piescaled" or "vennscaled" respectively. When piescaled, only pie charts may be constructed and when vennscaled, only Venn diagrams may be constructed. Each call may create one or more components (graph lines, histograms or sets of bar chart bars). With the exception of autoscaling, shading and relative data, there is no difference between two consecutive calls to one of these routines each constructing a single component, and one call containing both components in the correct order. Since a component is not "remembered" by the graphics routines, the first component on each call is treated as the first component of the chart in regard to shading between components and relative data. However, the index to current shading is used as is, and incremented for each component.

When a chart is drawn (with the exceptions of pie charts and Venn diagrams), a set of axes are constructed. Alternatively, the application may explicitly specify how the axes are to be constructed.

Axes are always Cartesian, but the application can vary the appearance and scaling of the axes in a number of ways.

Secondary axes may be defined as well as primary axes. With few exceptions, the secondary axes are treated like the primary axes. Alternatively, a duplicate of either axis may be defined instead of a secondary axis. Duplicate axes allow replication of the primary axis at a different position on the chart.

When the axes have been calculated for a particular picture, then the data is fetched from the relevant address in storage and plotted on to the axes using the routines mentioned above.

As the graphics routines 19 process and construct a picture line by line so the coordinates of each line which results from the processing are passed to the graphics manager 18.

The Graphics Manager—FIGS. 5-14

The graphics manager 18 has three main phases of operation for each picture. In the first phase, it accepts the coordinates of each line passed to it from the routines and builds a character definition set for the line. In the second phase, the total picture character definition set is constructed. The third phase is to construct and optimize a data stream which phase is concluded by sending the data stream via the system control services to the display unit.

Figure 5:
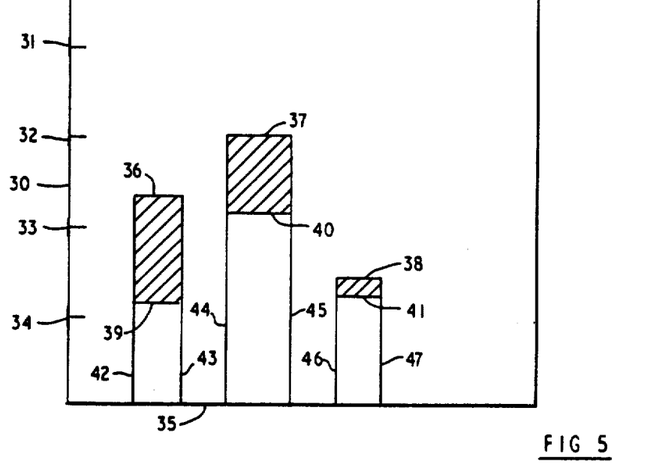
FIGS. 5 to 14 illustrate, by way of example, the operation of a component of the system control services.
Figure 6:
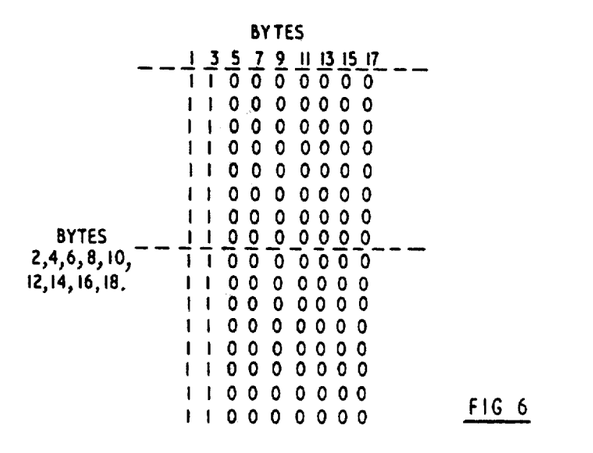

FIGS. 5 to 14 illustrate by way of example, the operation of the graphics manager 18. In this example it is assumed that the application program requires the system control services to display at a display unit a graph as shown in FIG. 5. The graph of FIG. 5 is shown on a 20×20 grid and for ease of explanation, it is assumed that each square on the grid represents one character cell on the screen of a cathode ray tube. Each cell is an array of 9×16 picture elements (pels) as illustrated in FIG. 6.

The graph of FIG. 5 has a Y axis 30 with four measurement marks 31 to 34. These marks may have labels such as quantity number associated with them, but they have been omitted from the example. There is an X axis 35 and six horizontal data indicating lines 36 to 41, together with six vertical lines 42 to 47. The areas between lines 36 and 39, 37 and 40, 38 and 41 are blocked in with either shading or a different color to the data lines.

The graphics routines 19 first pass to the graphics manager 18 the general information as to where on the screen the graph is to be drawn. In this example this is assumed to be the top left of the screen. The manager then knows that it has to construct a data stream that will load the portion of the character buffer store in the display head corresponding to the top left of the screen with references to character cell definitions also contained in the data stream. The character cell definitions will then be loaded into the character definition store in the display unit (FIG. 2).

Figure 13:
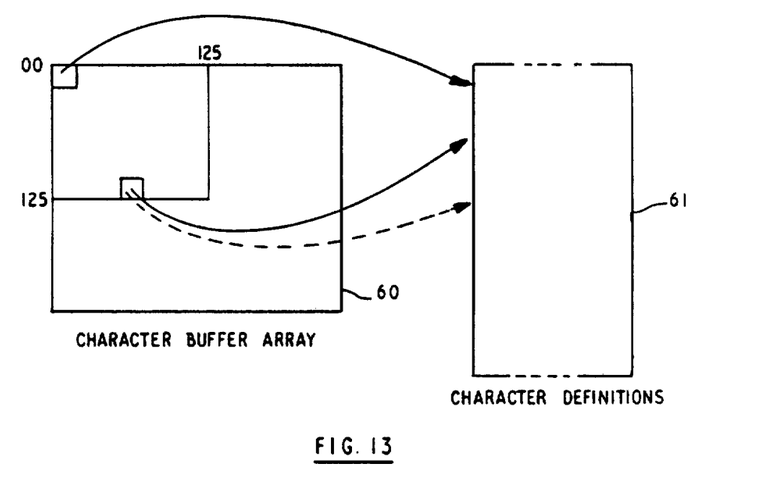

In order to do this, the manager has two stores shown in FIG. 13 into which it builds respectively the element character buffer part of the data stream and the character definitions.

The steps of building the elements for the graph in FIG. 5 are illustrated in FIGS. 7 to 11. The graphics routine first pass the coordinates of the X and Y axis together with the marker points 31 to 34. In examining the Y axis, the manager 18 determines that it is necessary to construct character definitions shown as A and B in FIG. 12. The definitions A and B are stored in the character definition store and pointers to them are entered in the character buffer array as shown in the left hand vertical column of FIG. 7.

Figure 12:
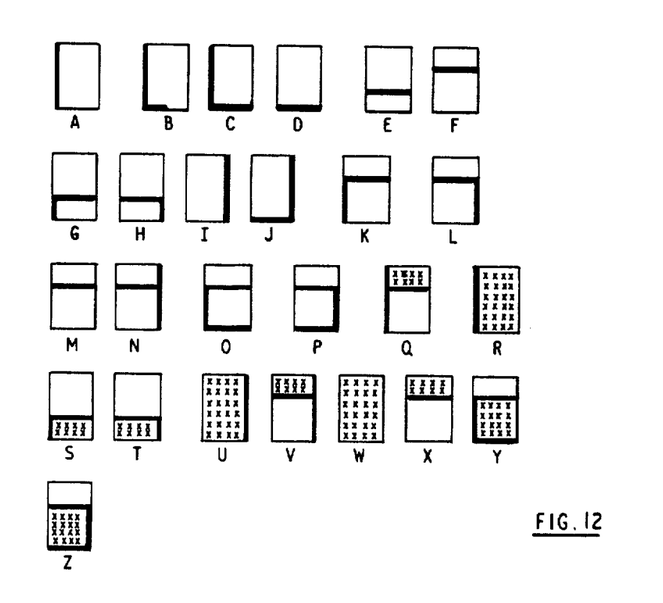

The character definition A of FIG. 12 is shown in an expanded form in FIG. 6. Each character cell is an array of 144 pels (9×16) which can be divided into eighteen eight bit bytes of storage. If the cell is to display a vertical line two pels wide on its left hand side, then bytes 1 to 4 will be all 1's and bytes 5 to 18 will be all 0's. If the cell is as shown at B (FIG. 12), then the bytes 6, 8 and 10 will have 1's in their positions 7 and 8. FIG. 6 is shown having a line two pels wide by way of example only, in practice most lines will only be one pel in width.

Figure 7:
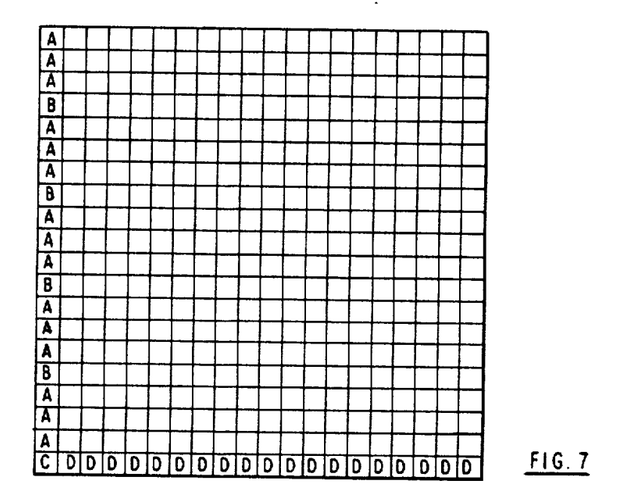

The X axis will require a cell pattern as is shown at D (FIG. 12), however, at the origin of the graph, the cell which had an A pattern when the Y axis was plotted will be changed to the C pattern of FIG. 12 and the contents of the character buffer array are as shown in FIG. 7 when both axes are plotted. Each letter represents a pointer to the address of the associated cell pattern in the character definition store.

Figure 8:
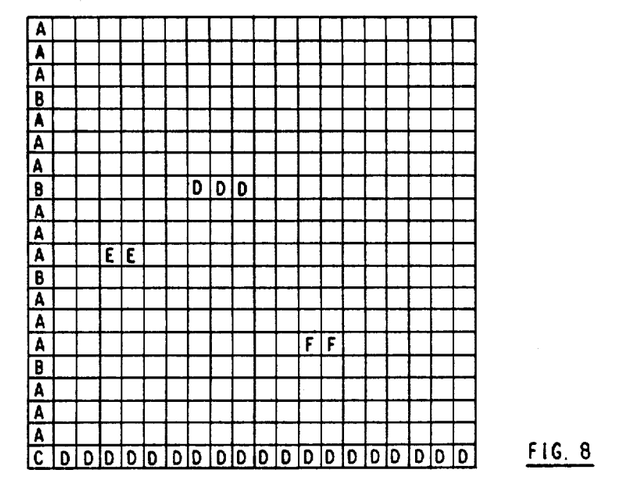

The next lines passed to the manager by the graphics routines are the lines 36, 37 and 38. The line 36 requires a horizontal line passing approximately one third of the way from the bottom of the cell. This is shown as pattern E in FIG. 12. The line 37 can be drawn using the previously constructed pattern D and the line 38 will require a pattern as shown at F in FIG. 12. FIG. 8 shows the character buffer array with these lines plotted.

Figure 9:
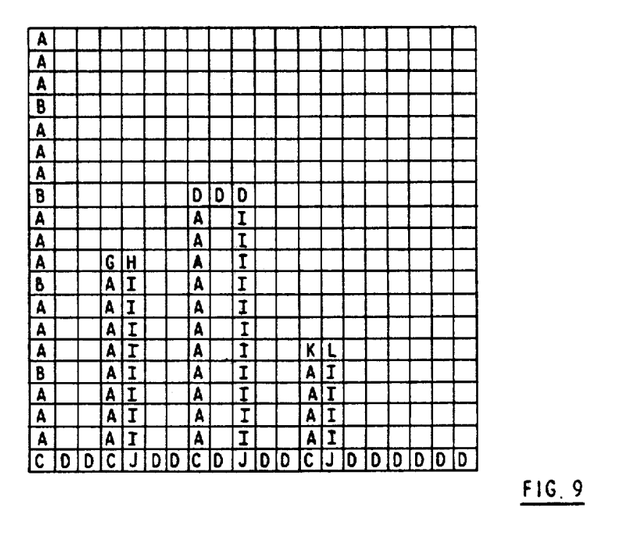
Figure 10:
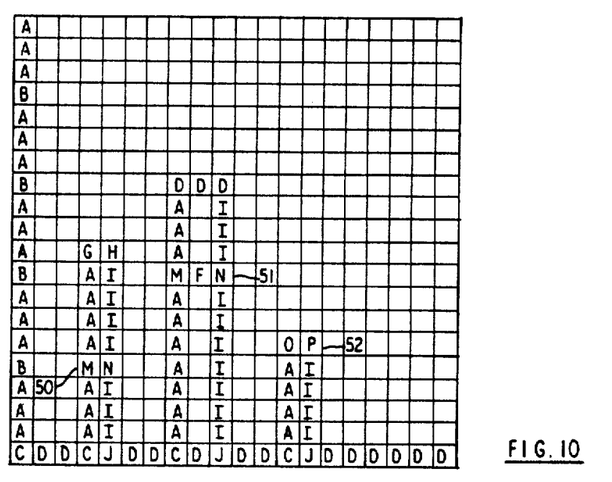

The next lines passed are the vertical lines 43 to 47 and these can be represented by using the pattern A together with the pattern C for the lines 42, 44 and 46. The lines 43, 45 and 47 require a pattern which is the inverse of A shown as pattern I in FIG. 12. Where the lines meet the horizontal lines 36, 37 and 38, a new pattern will be required. These are shown as G, H, K and L. The manager will then change the pointers to E in FIG. 8 to G and H shown in FIG. 9 and the pointers shown as F in FIG. 8 to K and L in FIG. 9. Where the lines 43, 45 and 47 meet the X axis, the pattern shown as J will be required and the references in the character buffer array for these cells will be changed to point to the pattern J. The pointers in the character buffer array when these lines have been plotted are shown in FIG. 9.

The next lines passed are the horizontal lines 39, 40 and 41, each of which will require modification to entries already in the character buffer array. The line 39 will require patterns shown as M and N (FIG. 12) to replace the A and I entries shown at 50 in FIG. 10. M and N patterns are also required for the line 40 shown at 51, but it is found that the pattern F already defined can be used to complete this line. The drawing of the line 41 requires that patterns O and P be developed and pointers to these patterns entered in the array at 52 replacing pointers to patterns K and L.

Figure 11:
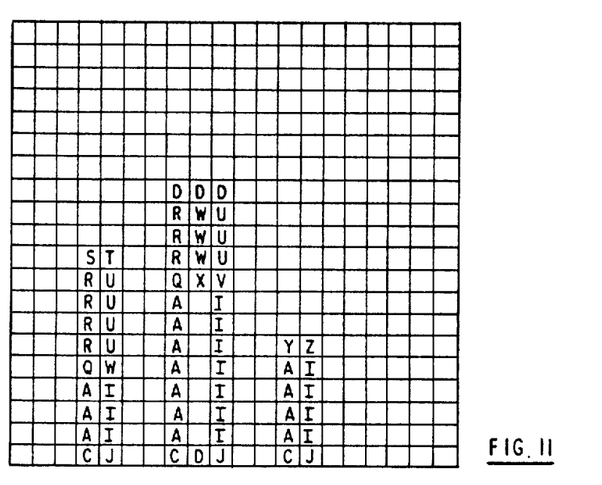

The final step is the filling in of the areas bounded by the lines 36 to 39, 37 to 40 and 38 to 41. This step requires the use of the patterns Q, R, S, T, U, V, W, X, Y and Z (FIG. 12) and results in the character buffer array having pointers as shown in FIG. 11.

It can be seen that if the shading of the areas is in the same color as the data lines 36 to 47, then the definitions U and W are the same and only one will be required. This is also true of S and T, and Y and Z.

The reference information held in the buffer array can also include in the extended attribute position information concerned with the color.

The extended attribute buffer 13 (FIG. 12) is an extension of the character buffer 12 and has a single byte (8 bits) storage position for each of the screen character positions. The eight bits contain the following information. Bits 1 and 2 concern highlighting. That is, when the display unit is monochrome, a character may be shown with one of the following properties:

(a) Normal
(b) Blinking
(c) Reverse video
(d) Underscored

Bits 3, 4 and 5 concern color. That is, each bit relates to one of the primary colors, red, green or blue. If only one is "on", then only the related particular "gun" will be "on" for that character. If all three are "on", then all the "guns" will be used for the character.

Bits 6, 7 and 8 concern the character definition buffer and refer to the particular character definition buffer containing the character cell definition to be used at the screen character position.

The extended attribute buffer has a reference to the particular character definition buffer and the character buffer refers to a particular definition in the selected character buffer.

Figure 14:
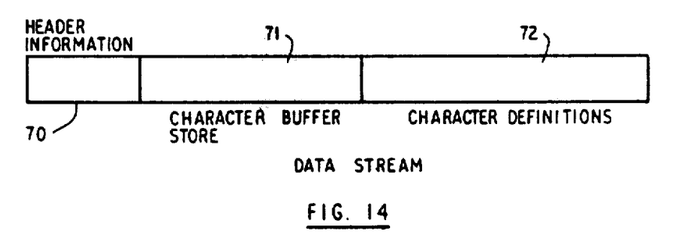

When the graphics routines have passed the complete picture to the graphics manager, it then instructs the graphics manager to complete the data stream and send the data stream to the relevant display unit. FIG. 13 shows in schematic form the information that the graphics manager then has. A store 60 which is allocated to the character buffer array has entries which correspond to the top left quarter of the screen which contain pointers to character definitions held in a store 61. The graphics manager then constructs in a separate store this data stream which is illustrated in FIG. 14. This includes header information 70, the information that has to be left in a character buffer store 71 and the character definitions 72.

When the data stream is constructed, it is passed via the DC System 16 and communication access control 15 (FIG. 3) to channel control unit 4 (FIG. 1) and then to the relevant network controller 5, display controller 3 and finally the display unit 6 which is running the relevant application program. The display unit stores the information contained in the data stream in the character buffer 12, extended attribute buffer 13 and the character definition buffers 7–11 as determined by address information accompanying the data.

If the display unit is a cathode ray tube which has a continuous raster scan, the picture displayed will change as the information in the character buffer and character definition buffers is changed, and when a completed data stream has been received, then the completed picture will be displayed.

Figures 15, 16:
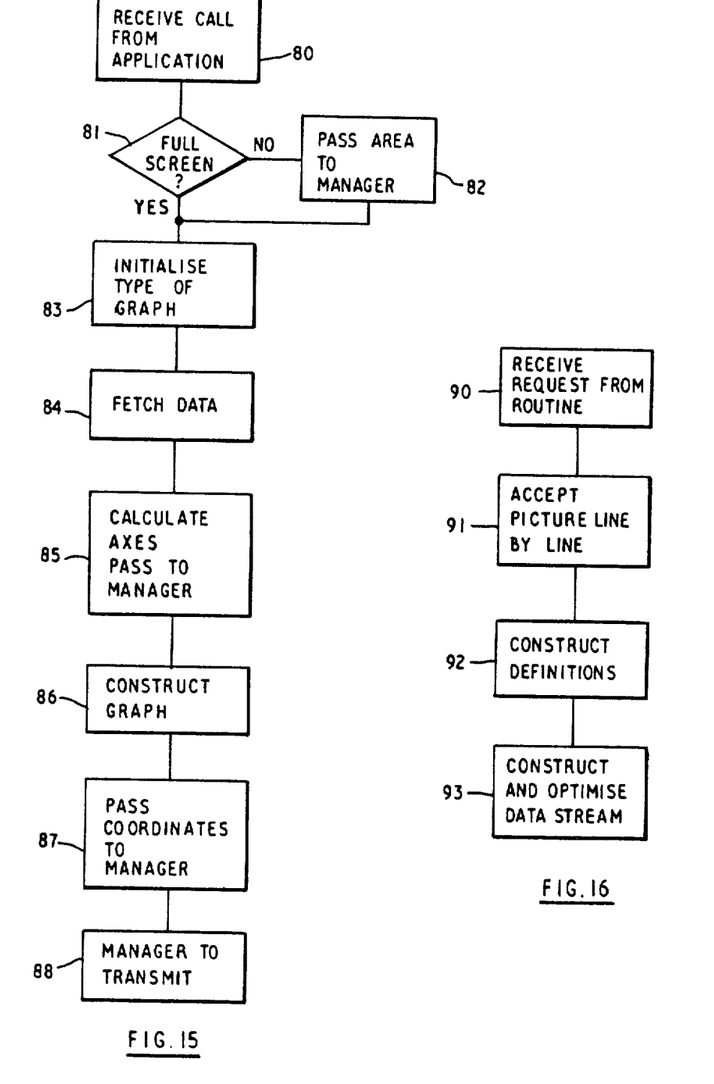
FIGS. 15 and 16 are flow diagrams illustrating the operations of the system.

The Flowcharts—FIGS. 15 and 16

The steps in the process described above are illustrated in the flowcharts shown in FIGS. 15 and 16. Referring to FIG. 15, the first step 80 is when the graphics routines receive a call from an application program. The second step 81 is to decide whether or not a full screen display is required. If not, then the display area is passed to the manager at the third step 82.

The next step 83 is to initialize the type of graph routine. The step at box 84 is to fetch the data from the relevant storage address and at 85 to calculate the axes coordinates and pass them to the manager. The steps illustrated as boxes 86, 87 and 88 are to first construct the graph, then pass the coordinates of all lines to the manager and finally tell the manager to transmit the data stream.

The actions of the graphics manager are summarized in FIG. 16. The four steps are shown as boxes 90, 91, 92 and 93. The first step 90 is to receive from the graphics routines the request to construct a picture. The second step 91 is to accept the picture line by line from the routines and simultaneously perform the third step, which is to construct the character definitions.

When the total picture has been received by the manager, the routines send an instruction to transmit. Then the data stream is constructed and optimized. Finally, the data stream is transmitted to the display unit.

Figures 17, 19:
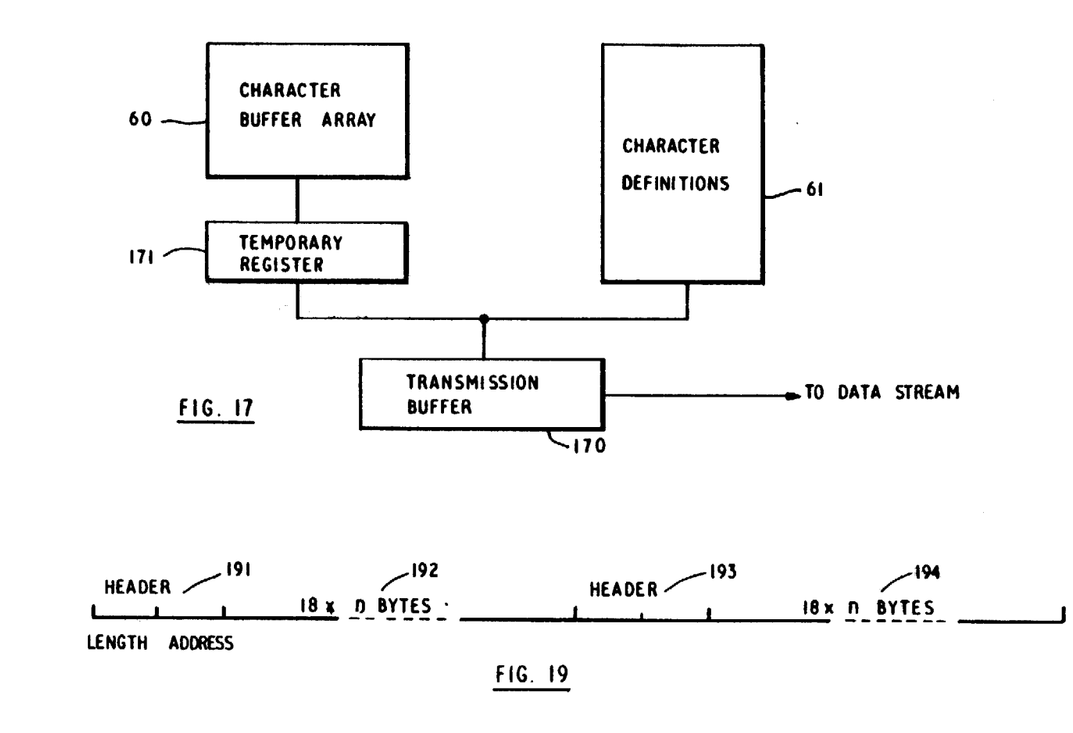
FIGS. 17, 18 and 19 illustrate the method of constructing a data stream.
Figure 18:
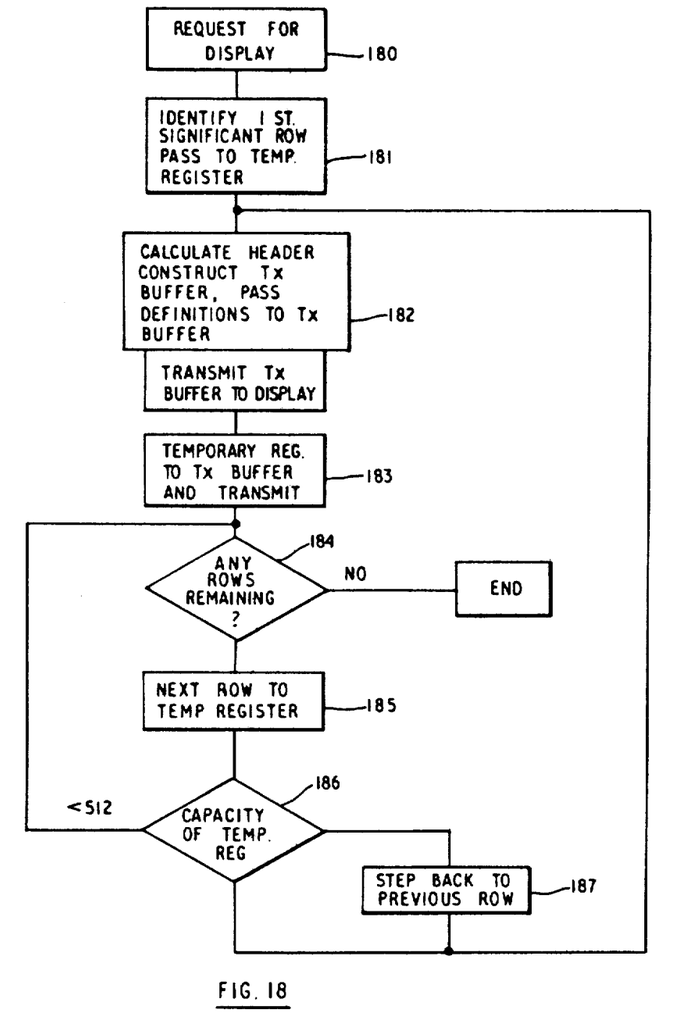

Interleaved Character Definition and Screen Definition Data—FIGS. 17, 18, 19

As the data stream containing the character buffer information and the character definition information for a new picture is received at a display unit, the information is loaded into the buffer stores. If the display unit is a raster scan cathode ray tube in continuous operation, the loading of either the character buffer or the character and definition buffer before the other will result in a corrupt picture, if the screen is not blanked. If the screen is blanked then the user will have to wait until both buffers are fully loaded before a picture appears. This wait can be an irritant to a user, particularly if it is longer than 20 or 30 seconds. In order to minimize the delay and make the wait acceptable to the user the following technique described with reference to FIGS. 17, 18 and 19 is used.

In general terms, if the screen is regarded as displaying rows of character cells, then the information for both the character buffer and character definitions is divided up at the central processing unit 1 into groups of rows and sent to the display unit as one block per group. So that, for example in a 32 row display, the top eight rows can be displayed to a user while the information relating to the next eight rows is sent. This technique is know as roller-blinding, as the picture appears from the top of the screen and builds towards the bottom. One particularly satisfactory embodiment using a screen with 32 rows is to send the information relating to the first significant row and then divide the rest according to the constraints of the transmission system between the central processing unit and the display unit. The most important constraint being the capacity of the transmission buffer in the central processing unit.

In the embodiment shown in FIG. 17, the central processing unit 1 (FIG. 1) includes a transmission buffer 170 which has a capacity of 512 bytes and into which data bytes are fed before being passed to the communication access control 15 (FIG. 3). The transmission buffer 170 receives an input from either the character buffer array 60 (FIG. 13) and the character definitions array 61 (FIG. 13). A temporary register 171 is used to store and count the output of the character buffer array. The method employed is illustrated in the flow chart of FIG. 18 and the format of the resultant data stream is shown in FIG. 19.

The graphics routines, or the user through the application program, passes an indication to the graphics manager to start to send a new picture to the display unit. This is shown as step 180. The method then follows the steps of identifying the first, or topmost, significant row in the character buffer array, 191. This row has to be identified as obviously if the top of the picture is blank, there will be no data to include in the data streams. When the first significant row has been identified, the data bytes relating to the significant or used character cell positions in that row are passed from the character buffer 60 array to the temporary register 171. When the significant character cells have been identified, the data relating to the character definition is passed to the transmission buffer and the first part of the data stream is built, step 182. This will be explained more clearly with reference to FIG. 19.

Whenever the transmission buffer has more than 494 bytes of character definition data, which includes header information and 18×n bytes of character cell definitions, the contents are passed to the communications access control 15 of FIG. 3 and transmitted to the display unit.

At step 183, when all the relevant character cell definitions have been transmitted then the contents of the temporary register 171 are transferred to the transmission buffer and transmitted to the display unit. The display unit then has the data necessary to display the first significant row of the new picture.

The next step 184 is to determine if there are any more significant rows in the character buffer to send. It there are not, then the complete picture has been sent and the system ends that particular transmission. If there are more rows to send, then the next row in the character array is passed to the temporary register, step 185.

Because the transmission buffer 170 has a maximum capacity of 512 bytes when it transfers to the transmission buffer. The steps to overcome this problem are shown at 186 and 187. Step 186 has three exits, the first, if the register 171 has less than 512 bytes, then the step 185 is repeated, if there are more than 512 bytes, then the step 187 is entered, if there are exactly 512 bytes, then the step 182 is repeated. The step 187 is to examine the contents of the temporary register 171 and remove the bytes associated with the last row of the character buffer array entered. Following this the step 182 is repeated.

By following the flow chart of FIG. 18 it can be seen that the data stream for a picture comprises blocks of character cell definitions, together with header information which may, and in most cases uses, the transmission buffer more than once followed by one set of character buffer information of never more than 512 bytes (one transmission buffer).

The character cell definition data stream is shown in FIG. 19, and is constructed in the transmission buffer 170. The leading six bytes are referred to as headers and contain the program character set address (3 bytes) and the number of bytes that follow associated with that header, this number will be 18×n as there are eighteen bytes required for each character cell definition. When a new character cell address is required then a new six byte header block is created. In FIG. 19 the first 6 byte header is shown at 191, followed by an 18×n block of character cell definitions 192, followed by a second header 193 and a second character cell definition block 194.

Bytes are entered into the transmission buffer 170 from the character definition array 61 in parallel so that as each eighteen byte definition is entered the length or number position of the associated header is updated.

As a character cell definition for a particular picture is sent to the display unit only once, then as the character buffer approaches the bottom row there will be fewer character cell definitions in the data stream.

Using the method described above, a user requesting the system to display a new picture is faced with a relatively short time before the display unit starts to build the picture in front of him. There are, of course, other derivations from the method that can be used as, for example, using an equal division of rows of the character buffer as a criterion for sending the data to the display unit. This will usually mean a slightly longer wait before a picture starts to appear at the display unit, and may lead to a non-optimal use of the transmission system.

While the invention has been particularly shown and described with reference to preferred embodiments thereof, it will be understood by those skilled in the art that various changes in form and detail may be made therein without departing from the spirit and scope of the invention.

Having thus described our invention, what we claim as new, and desire to secure by Letters Patent is:

1. A digital data display system in which a raster scanned display device includes a character definition buffer store and a screen buffer for storing screen definition data relating display screen areas with character definitions stored in the character definition buffer store, means for operating the display device, the character definition buffer store and the screen buffer for displaying a picture and/or text in a row and column array of cell positions on the display device, a processing unit connected to the display device through a communications link and having means responsive to a command to send character definition data and screen buffer data to the display device to present a new picture on the screen, the character definition data and the screen buffer data for a new picture being an amount of data that is ordinarily sent to the display device in a series of transmissions, wherein the improvement comprises, means in the processing unit responsive to a command to present a new picture on the screen of the display device to send screen buffer data and character definition data to the display device interleaved in a series of transmissions with each transmission including character definition data for any new character required by the screen definition data of the same transmission whereby the new picture is built and displayed on the screen from the transmissions of data as they are received at the display device and stored in the buffer and screen stores.

2. A digital data display system as claimed in claim 1 in which the processor includes means for first sending to the display device the screen buffer and character definition data relating to the top row of character cells of a picture to be displayed.

3. A digital data display system as claimed in claim 2 in which the processor contains means operable after the first transmission of data has been sent to the display device to establish the size of the remaining groups according to the characteristics of the communication link.

4. A digital data display system as claimed in claim 3 in which the processing unit includes a transmission buffer having a predetermined data byte capacity and the means to establish the size of the transmission of data bytes sent to the display device includes means responsive to the byte capacity of the transmission buffer.

5. A digital data display system as claimed in claim 4 in which a picture to be displayed is divided into a number of character rows and the means to establish the size of the transmissions of data sent to the display device includes means responsive to the division of the character rows.

6. A method for operating a digital data graphics display system in which a raster scanned display device includes a character definition buffer store and a screen buffer for storing screen definition data relating display screen areas with character definitions stored in the character definition buffer store, and includes means for operating the display device, the character definition buffer store and the screen buffer for displaying a picture and/or text in a row and column array of cell positions on the display device, and in which a processing unit is connected to the display device through a communications link and has means responsive to a command to send character definition data and screen buffer data to the display device to present a new picture on the screen, the method comprising the following steps, in response to a command to present a new picture on the screen of the display, sending screen buffer data to the display device in a series of transmissions, and sending interleaved with the screen data in each transmissions character definition data only for any new character required by by the screen definition data of the same transmission, whereby the new picture is built and displayed on the screen as screen data and the accompanying character definition data are received at the display device and stored in the buffer and screen stores.

* * * * *